(No Model.) 5 Sheets—Sheet 1.

W. P. CANNING.
STOP MOTION MECHANISM FOR MACHINES FOR PREPARING SLIVERS.

No. 550,249. Patented Nov. 26, 1895.

WITNESSES.
Channing Whitaker.
Mary Caverly.

INVENTOR.
William P. Canning (No Model.) 5 Sheets—Sheet 3.

W. P. CANNING.
STOP MOTION MECHANISM FOR MACHINES FOR PREPARING SLIVERS.

No. 550,249. Patented Nov. 26, 1895.

WITNESSES. INVENTOR.
Channing Whitaker. William P. Canning.
Mary Taverly.

(No Model.) 5 Sheets—Sheet 4.
W. P. CANNING.
STOP MOTION MECHANISM FOR MACHINES FOR PREPARING SLIVERS.
No. 550,249. Patented Nov. 26, 1895.
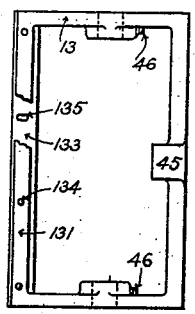
Fig. 25.
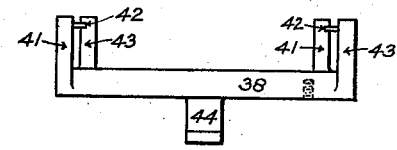
Fig. 23. Fig. 21.
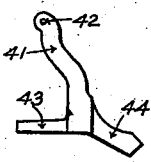
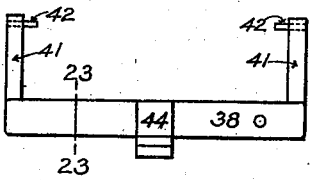
Fig. 22. Fig. 20.
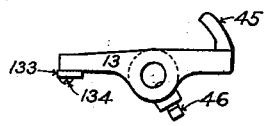
Fig. 24.
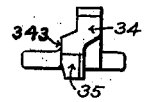
Fig. 19.
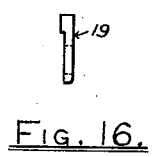
Fig. 16.
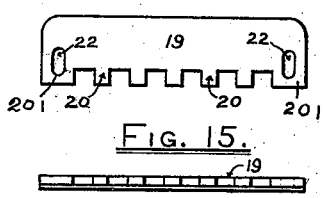
Fig. 15.
Fig. 14.
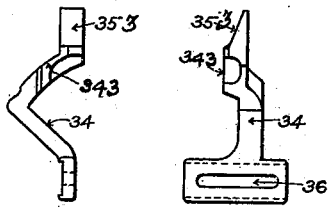
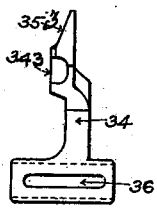
Fig. 17. Fig. 18.
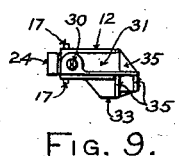
Fig. 9.
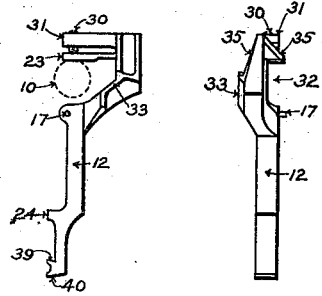
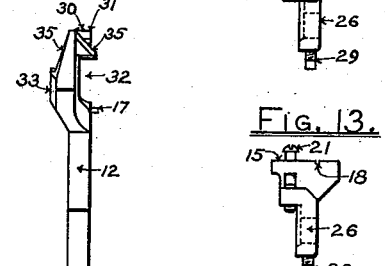
Fig. 13.
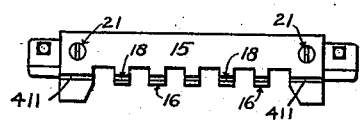
Fig. 11.
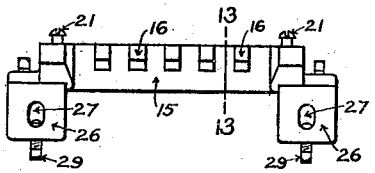
Fig. 7. Fig. 8. Fig. 12. Fig. 10.
WITNESSES.
Channing Whitaker.
Mary Taverly.
INVENTOR.
William P. Canning.

UNITED STATES PATENT OFFICE.

WILLIAM P. CANNING, OF LOWELL, MASSACHUSETTS, ASSIGNOR TO THE LOWELL MACHINE SHOP, OF SAME PLACE.

STOP-MOTION MECHANISM FOR MACHINES FOR PREPARING SLIVERS.

SPECIFICATION forming part of Letters Patent No. 550,249, dated November 26, 1895.

Application filed May 3, 1895. Serial No. 547,998. (No model.)

*To all whom it may concern:*

Be it known that I, WILLIAM PITT CANNING, a citizen of the United States, residing at Lowell, in the county of Middlesex and Commonwealth of Massachusetts, have invented certain new and useful Improvements in Stop-Motion Mechanisms for Machines for Preparing Slivers, of which the following is a specification, reference being had therein to the accompanying drawings.

My invention relates chiefly to stop-motion mechanisms for machines for preparing slivers, although certain features thereof are equally well adapted for use in other connections and are intended to be applied to such use.

The invention has for its object to provide a stop-motion mechanism of novel and improved character adapted to act whenever an excessive thickness or enlargement presents itself in the sliver or the latter breaks, runs out, or becomes unduly attenuated.

The invention consists in certain features of novel construction and combination, all as hereinafter will be explained fully with reference to the accompanying drawings and afterward will be more particularly pointed out and distinctly defined in the claims at the close of this specification.

Figure 1:
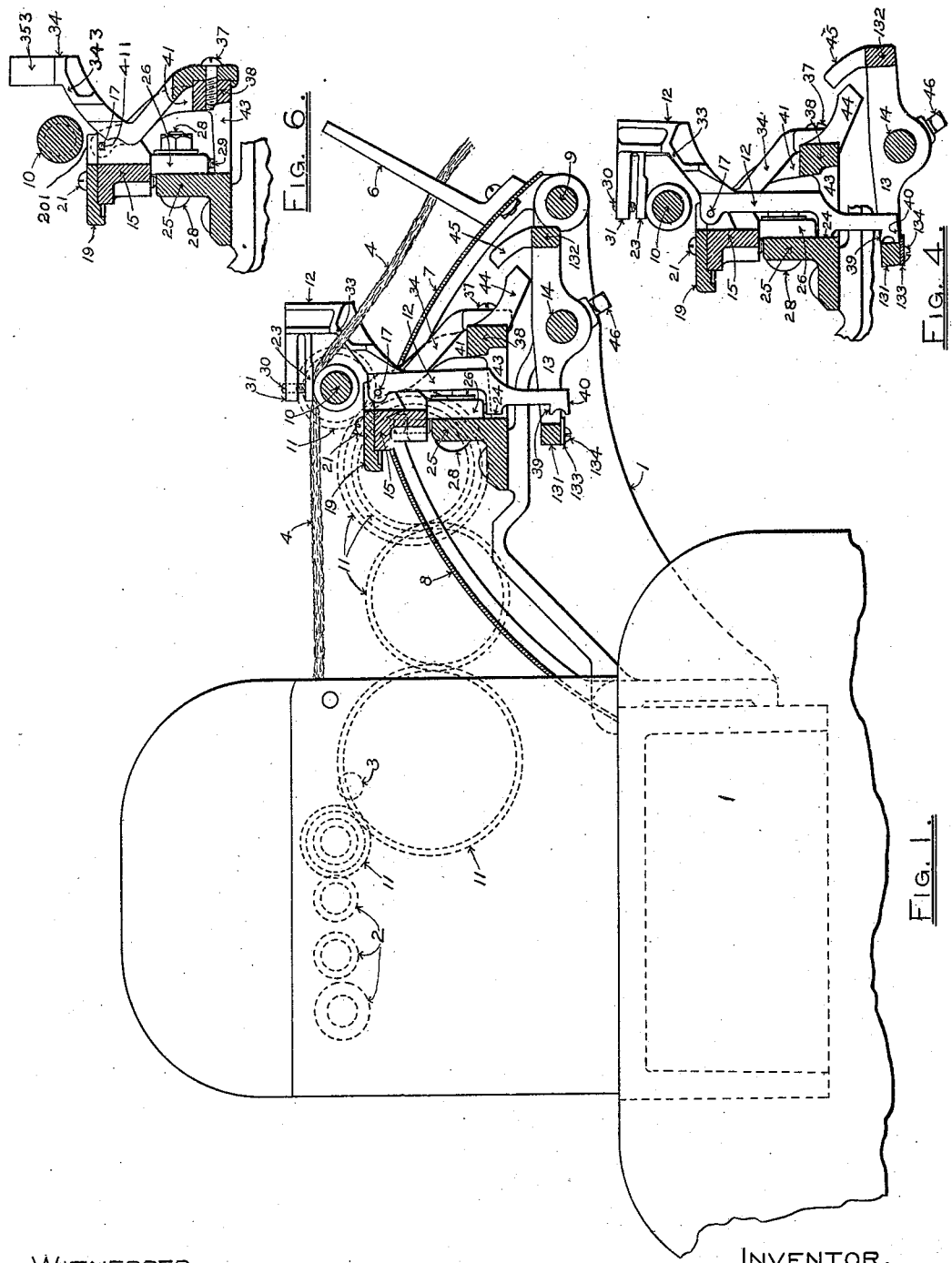
Figure 2:
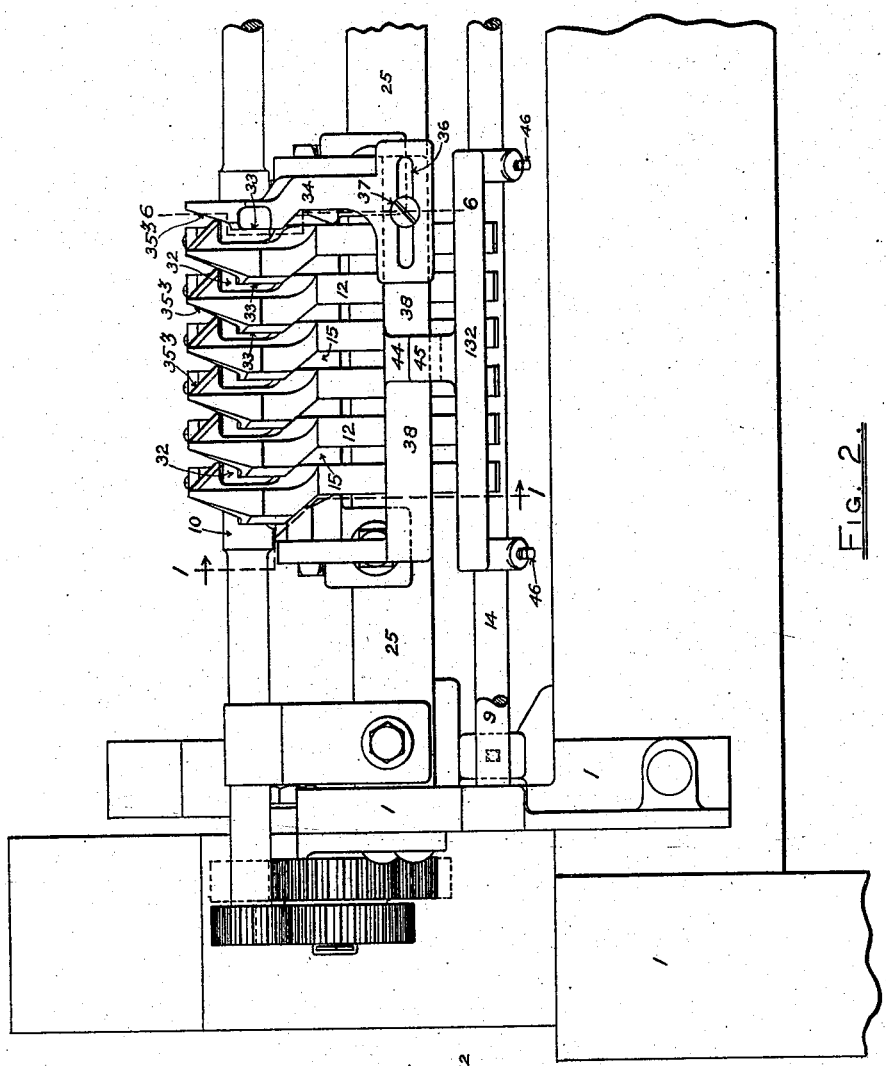
Figure 3:
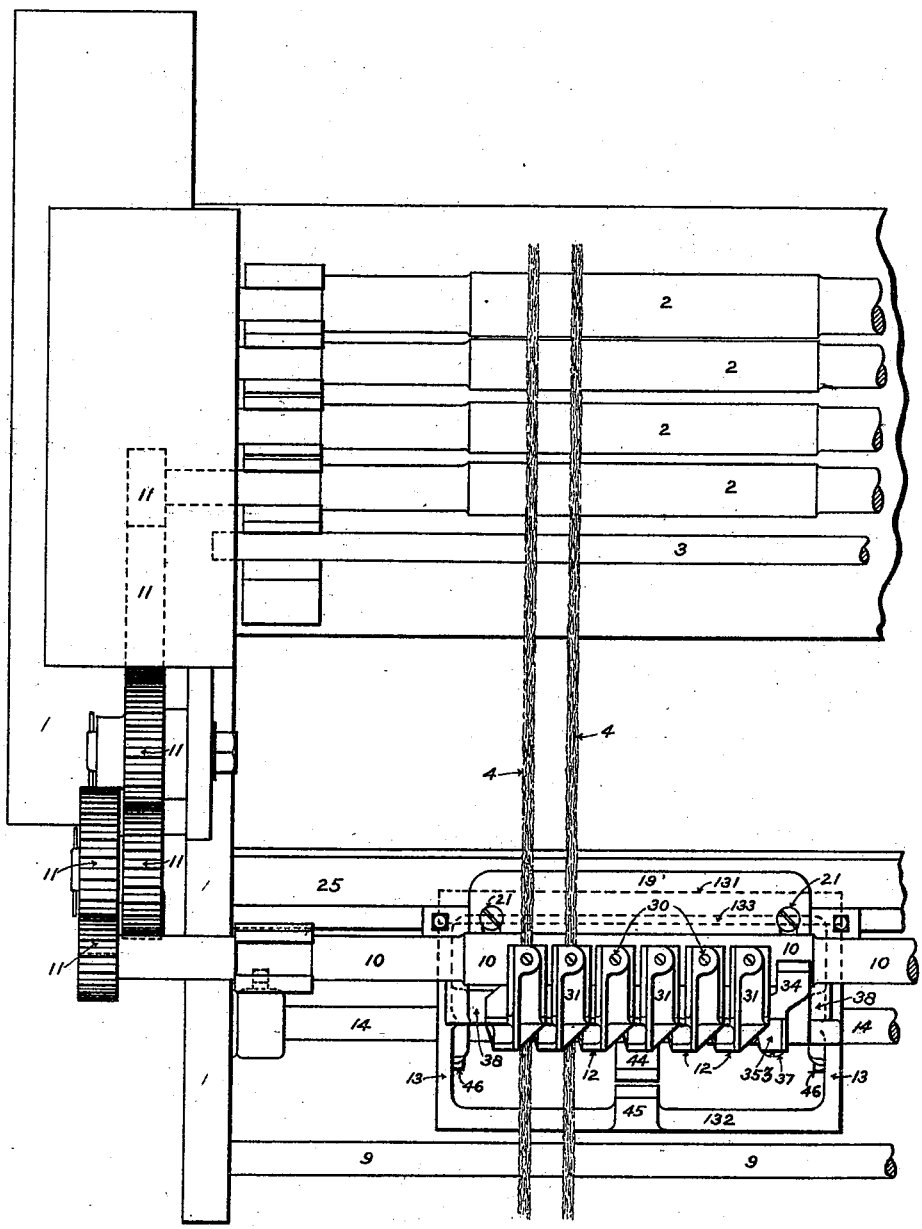
Figure 26:
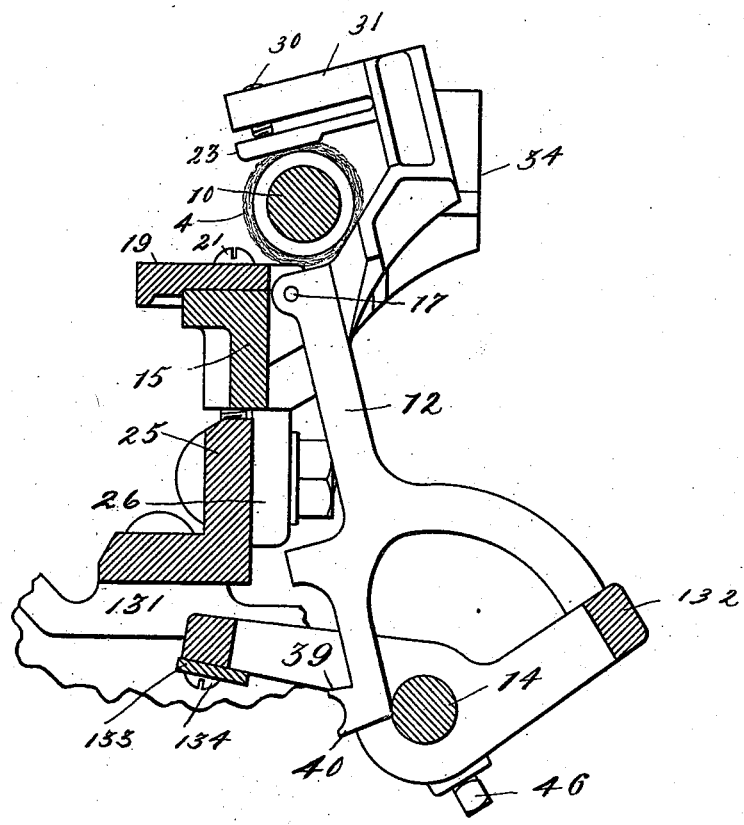

In the drawings, Figure 1, Sheet 1, is a view in side elevation, partly in vertical section on line 1 1, Fig. 2, of part of a drawing-frame having the invention applied thereto, enough of the drawing-frame being represented to make clear the manner of reducing the invention to practice. Fig. 2, Sheet 2, is a view in elevation of a part of the drawing-frame, looking from the right-hand side in Fig. 1, the cover 7 and part of its supporting-rod being removed. Fig. 3, Sheet 3, is a view in plan of so much of the machine as is shown in Figs. 1 and 2, the covers 7 and 8 being removed. Fig. 4, Sheet 1, and Fig. 5, Sheet 2, are views of the stop-motion mechanism in transverse vertical section on line 1 1 of Fig. 2, showing the two extreme positions of the detector or presser-lever which is described hereinafter. Fig. 6, Sheet 1, is a view in transverse vertical section on line 6 6 of Fig. 2. Figs. 7 to 25, Sheet 4, are detail views and are more fully described hereinafter. Fig. 26, Sheet 5, is a view similar in character to Fig. 5, but on an enlarged scale, showing a modification.

1 is the framework of a drawing-frame.

2 2 are drawing-rollers, such as usually are employed in a drawing-frame. Only the lower rollers of a set are shown.

3 (see Fig. 3, Sheet 3) is a rod located in advance of the drawing-rollers to support the slivers as the latter pass into the bite of the first pair of the drawing-rollers.

4 4 are slivers, which are shown as entering the drawing-frame.

6 designates guides, through which the slivers pass as they enter the machine.

7 8, Fig. 1, are covers, which are employed at the entrance side of the machine, the guides 6 being affixed to the cover 7.

9 is the supporting-rod of the cover 7.

The foregoing are or may be all as usual or as desired. It will be understood that so much of a drawing-frame as I have represented in the drawings is shown simply with the object in view of making clear one way of applying and utilizing the invention, and also that the invention is not restricted to use in connection with drawing-frames only.

My improved stop-motion mechanism is shown as arranged to act in connection with the slivers as they pass from the guides 6 to the drawing-rollers 2 2. Essential features of the said stop-motion mechanism are a backing or rest for the slivers located adjacent to the line of passage of the latter, detector devices for the respective slivers, the said detector devices being in the form of pressers acting to compress the slivers against the said backing or rest, and each having its position determined by the thickness of the portion of the sliver between it and the backing or rest and oscillating as the said thickness varies, and motion-arresting devices which coact with the said detector devices as the positions of the latter change in accordance with variations in the thickness of the slivers between them and the backing or rest.

In the illustrated embodiment of the invention 10 is the backing or rest aforesaid. Preferably in order to facilitate the movement of the slivers the said backing or rest is constituted, as shown, by a roller, on the surface of which the slivers rest, and for the best results the said roller is rotated by means of suitable driving connections, so as to cause the surface thereof to move in the same direction as the slivers resting thereon. Figs. 1, 2, and 3 show the roller 10 driven by means of gears 11 11 from the drawing-rollers 2.

12 12 are the detector devices or pressers aforesaid. They preferably are in the form of levers, as shown, and, as represented in Fig. 1, each sliver, passing over the backing or rest constituted by the roller 10, is compressed against the surface of the latter by a presser-surface on the corresponding presser-lever 12. Preferably the presser-lever is mounted to swing back and forth in the direction of the line of passage of the sliver, and the position assumed by the presser-lever will vary according as the portion of sliver which intervenes between the presser-surface thereof and the surface of the backing or rest 10 varies in thickness or breaks or runs out.

As an element of the motion-arresting devices, I employ by preference what is termed sometimes a "striker," it being located adjacent to the presser-levers and having movement communicated to it through suitable actuating connections. The said striker is arranged for coaction with the presser-levers in manner like unto that which is customary in similar cases. In connection with the so-called "striker" I contemplate employing in practice actuating connections for the same of known and usual character, having combined or associated therewith shipping or other devices, acting, when the movement of the striker is arrested, to disconnect the motive power from the operative mechanism of the machine. A convenient form of striker is shown at 13, it being mounted upon a rock-shaft 14. 46 46 are clamping-screws, by means of which the striker is made fast upon the said rock-shaft. The devices providing for the actuation of the said rock-shaft and the shipping or other devices associated therewith for disconnecting the motive power are not shown, because various forms of such devices are well known and in common use, and those employed may be of any suitable or known character.

The preferred manner of mounting and arranging the presser-levers 12 is illustrated in the drawings. The said presser-levers are supported by a stand 15, that is attached to the machine-framing. A view of the said stand in front elevation is given in Fig. 10, Sheet 4. Fig. 11, Sheet 4, shows the same in plan. Fig. 12 shows the same in end elevation. Fig. 13 is a view in vertical section on line 13 13 of Fig. 10. The cross-bar of the said stand is formed with a series of lugs or projections 16 16, and in the spaces between these lugs the presser-levers 12 are placed, the said presser-levers being provided with laterally-projecting pivots or journals 17 17, which are received in the grooves 18 18, that are formed in the upper sides of the said lugs. A cap-plate 19 is fitted to the said stand 15. Fig. 14, Sheet 4, shows an edge view of said cap-plate. Fig. 15, Sheet 4, is a plan thereof. Fig. 16, Sheet 4, is an end view thereof. Lugs 20 20 on said cap-plate, corresponding in spacing, &c., with the lugs 16, overlie the latter and retain the journals or pivots 17 17 in the grooves 18 18. The said cap-plate is secured to the said stand by screws 21 21 passing through slots 22 22 in the cap-plate and entering the stand.

One of the presser-levers is shown in side elevation in Fig. 7, Sheet 4. Fig. 8, Sheet 4, is an edge view thereof, looking from the right in Fig. 7. Fig. 9, Sheet 4, is a view thereof in plan. The presser-surface of each lever is formed on a press-plate 23, carried by the said presser-lever. The portion of the presser-lever with which the press-plate is connected is offset with relation to the pivots or journals 17 17 sufficiently to overbalance the presser-lever and tend to cause the latter to turn on the said pivots or journals in a direction which is the reverse of that in which the sliver travels.

Fig. 4, Sheet 1, shows the position into which the presser-lever gravitates when the sliver is absent. In this position the stop 24 on the presser-lever rests in contact with the rail or cross-bar 25, forming part of the framework of the machine, and the under surface of the press-plate almost touches the surface of the roller 10. If desired, the said surface of the press-plate may touch the surface of the roller; but this will result in wear of the two surfaces. When the sliver is present beneath the press-plate, the presser-lever assumes a position which is determined by the quantity of fibers that is compressed between the press-plate and the roller 10. (See Fig. 1.) Preferably I locate the pivotal bearings of the presser-lever on one side of the line of passage of the sliver at the place where the press-plate bears thereon and approximately in a plane which is perpendicular to the said line of passage at the said place. I have shown the said bearings located at the same side of the said line of passage as the backing or rest constituted by the roller 10, and deem this position advisable, inasmuch as it renders the mechanism more simple and compact and also leaves the same free from obstruction above to interfere with the insertion and manipulation of the slivers. Moreover, the said bearings are a little in the lead of the plane aforesaid—that is, are on the side thereof which is nearer the drawing-rollers. By thus locating the bearings of the presser-levers on the delivery side of the said plane it results that as the upper end of the presser-lever is forced by an increased thickness of the sliver in the direction in which the sliver moves its press-plate swings gradually away from the surface of the roller 10, so as to increase the space between the press-plate and roller, thereby facilitating the passage of the sliver and obviating breakage of the latter.

Fig. 5, Sheet 2, shows the position into which the presser-lever is forced by an excessive increase in the thickness of the sliver between the press-plate and the roller 10. In the said figure the presser-lever is shown as having been carried into the position referred to above in consequence of the sliver having become wound or lapped around the roller 10. It assumes this position also whenever the sliver, as it passes on toward the drawing-rollers, increases in thickness beyond the desired extent.

For the purpose of adapting the stop-motion devices to changes in the character and sizes of the slivers being handled the stand 15 is made adjustable in a direction toward and from the roller 10, whereby the entire series of presser-levers may be adjusted at once relatively to the said roller. To this end the plates or lugs 26 26 at the opposite ends of the stand 15 (see Figs. 4, 5, and 10) are slotted vertically at 27 27, Fig. 10, for the passage of the bolts 28 28, whereby the said stand is bolted to the cross-rail 25. In order to insure precision in the adjustment of the stand, set-screws 29 29 are fitted to threaded holes through the said plates or lugs 26 26 and arranged to bear against the under sides of the bolts 28 28. (See Fig. 10.)

In order to compensate for differences or variations among the presser-levers and enable the respective presser-levers of the series which is employed to be adapted properly to the requirements of the work, I provide each of the said presser-levers with means for adjusting the press-plate thereof toward and from the backing or rest. For example, I provide in connection with the said press-plate a set-screw 30, one end of which bears against the reverse side of the press-plate. This set-screw is fitted to a threaded hole in a projecting part or lug 31 on the press-lever, and it determines the position of the press-plate. On turning said set-screw the press-plate is forced nearer to the backing or rest or may be allowed to move away therefrom, this depending on whether the set-screw is turned in or out in its threaded hole. Preferably the press-plate is integral with the presser-lever, being united at one end thereof to the main part of the latter, and it being bent or sprung toward the roller 10 by the action of the set-screw and returning by virtue of its elasticity to its normal position as the pressure of the set-screw is relaxed.

For the purpose of permitting the sliver to pass beneath the press-plate without being deflected laterally by the body of the presser-lever the latter is formed in its upper part with a lateral recess 32, open at one side. (See Fig. 2, Sheet 2, and Fig. 8, Sheet 4.) The sliver passes into this recess and underneath the press-plate on being dropped into the space which exists between the upper ends of each two adjacent presser-levers. (See Fig. 2.) Each presser-lever is provided on the side thereof opposite to that on which said recess is formed with a surface 33, constituting a lateral guide for the next adjacent sliver, such guide operating to retain the said sliver in the recess of its presser-lever and in position to pass beneath the press-plate of such presser-lever. Thus it will appear from inspection of Fig. 2 each presser-lever by its surface 33 retains the sliver in the recess of the next presser-lever, and beneath the press-plate of the latter. For the purpose of retaining the sliver in the recess of the presser-lever which is at the right-hand end of the series of presser-levers I provide a finger 34, which is shown separately in edge and side views in Figs. 17 and 18, respectively, Sheet 4, and in plan in Fig. 19, Sheet 4. It is also shown in Fig. 6. This finger has a lateral guide-surface 343 corresponding with the lateral guide-surface on each of the presser-levers, it operating to retain the sliver within the recess of the adjoining endmost presser-lever. In order to facilitate the placing of the slivers in the recesses, each presser-lever is formed at its upper extremity with oppositely-sloping inclines 35 35, to admit and direct the slivers downwardly at the two sides of the presser-lever. The upper extremity of the finger 34 is formed with a like sloping incline 353 on the side thereof next the adjoining presser-lever. From time to time the number of presser-levers in use in a series is varied from greater to less, as occasion may require—that is to say, the number of slivers which are fed through side by side and joined into one on the delivery side of the machine is varied from time to time. In order to compensate for the removal of such of the unused presser-levers as may be taken away from the right-hand end of the series of presser-levers, the finger 34 is made adjustable laterally, so that it may always be kept in proper proximity to the last presser-lever at the said end of the series. To this end its lower portion is formed with a horizontal slot 36, through which is passed the screw 37, which holds the said finger to its support. In this case the said support is constituted by the cross-bar of the swinging bunter 38.

The striker 13 illustrated in the drawings has two side bars 131 and 132, respectively, extending parallel with the rock-shaft 14. Side bar 131 has attached thereto a striker-plate 133, one edge of which projects inwardly of the said side bar toward the rock-shaft. (See more particularly Figs. 1, 4, and 5.) An end view of said striker is given in Fig. 24, Sheet 4, and a plan in Fig. 25, same sheet. In Fig. 25 part of the side bar 131 is broken away in order to show the portion of the striker-plate 133 which is below the broken-out part. The striker-plate is fixed to the side bar 131 by screws 134, and the said screws pass through transverse slots 135 in said striker-plate, these slots enabling the latter to be adjusted to vary the extent of its projection. The lower extremity of each presser-lever has a projection or projections, as shown, forming upper and lower shoulders 39 40, (see Fig. 7, Sheet 4,) for engagement with the inner edge of the striker-plate, the latter being made of steel to secure durability. Whenever the presser-lever swings into the position in which it is represented in Fig. 4, which it will do whenever the sliver acting thereon breaks, runs out, or becomes too much attenuated, the said edge of the striker-plate will engage with one or the other of the shoulders, the particular shoulder which is engaged depending on the direction in which the striker is moving at the time. The striker-plate, as will be perceived, will engage with the presser-lever in whichever direction the striker may be moving, thus avoiding loss of time in arresting the action of the machine. The striker may engage with the presser-levers directly, in the position of the latter which they are caused to assume by the passage of an unduly-increased thickness of sliver between their press-plates and the roller 10, if desired. This is shown by Fig. 26, Sheet 5. Preferably, however, I arrange a bunter-frame 38 adjacent to the said presser-levers. When one or more of the presser-levers is forced into the position represented in Fig. 5, the lower end or ends thereof presses against the cross-bar of the bunter-frame, causing the latter to assume the position that is represented in Fig. 5.

Figs. 1 and 4, Sheet 1, show the bunter-frame in its normal position. The said bunter-frame is shown in front elevation in Fig. 20, Sheet 4, in plan in Fig. 21, Sheet 4, in end elevation in Fig. 22, Sheet 4, and in section on line 23 23 of Fig. 20 in Fig. 23, Sheet 4. It is provided with side arms 41 41, having journals or pivot-pins 42 42, by means of which it is connected pivotally with the stand 15, the said journals or pivot-pins fitting in grooves 411 411 at the ends of the said stand and being retained therein by lugs 201 201 at the ends of the cap-plate 19. The cross-bar of the bunter-frame is provided with stop-fingers 43 43, which rest against the rail 25 and thereby determine the normal position of the bunter-frame, as shown in Fig. 6, Sheet 1. A toe or projection 44 on the cross-bar comes into the range of movement of a similar toe or projection 45 on the side bar 132 of the striker whenever the bunter-frame is caused to assume the position that is represented in Fig. 5, and thereby arrests the movement of the striker, occasioning the stoppage of the machine.

What I claim is—

1. Stop-motion mechanism comprising a backing or rest for the sliver, a detector-device to compress the sliver against the said backing or rest, movable in the direction of the line of passage of the sliver and adapted to be held advanced in the direction of the said line of passage by the thickness of the portion of sliver which lies between it and the said backing or rest, and motion-arresting devices co-acting with the said detector-device as the latter oscillates in accordance with variations in the thickness of the sliver, substantially as and for the purposes set forth.

2. Stop-motion mechanism comprising a backing or rest for the sliver, a lever to compress the sliver against the said backing or rest, mounted to swing in the direction of the line of passage of the sliver and adapted to be held advanced in the direction of the said line of passage by the thickness of the portion of sliver between it and the said backing or rest, and motion-arresting devices co-acting with the said lever as the latter swings, substantially as set forth.

3. Stop-motion mechanism comprising a roller, a detector-device compressing the sliver against the said roller, movable in the direction of the line of passage of the sliver as the thickness of the latter varies, and adapted to be held advanced by the thickness of the portion of the sliver between it and the said roller, and motion-arresting devices co-acting with the said detector-device as the latter oscillates, substantially as and for the purposes set forth.

4. Stop-motion mechanism comprising a roller, a detector-lever, mounted to swing in the direction of the line of passage of the sliver as the thickness of the latter varies, and adapted to be held advanced by the thickness of the portion of sliver between it and the said roller, and motion-arresting devices co-acting with the said detector-lever as the latter swings, substantially as and for the purposes set forth.

5. The combination with a backing or rest for the sliver, of a presser-lever compressing the sliver against the said backing or rest and having its pivot on the same side of the line of passage of the sliver as the backing or rest and on the delivery side of the point of nearest approach between the presser-lever and the backing or rest, substantially as set forth.

6. The combination with a roller, of a presser-lever compressing the sliver against the said roller and having its pivot on the same side of the line of passage of the sliver as the roller and on the delivery side of the point of nearest approach between the presser-lever and roller, substantially as set forth.

7. Stop-motion mechanism comprising a backing or rest for the sliver, a presser-lever compressing the sliver against the said backing or rest and having its pivot on the same side of the line of passage of the sliver as the backing or rest, and on the delivery side of the point of nearest approach between the presser-lever and backing or rest, and motion-arresting devices co-acting with the said presser-lever as the latter oscillates, substantially as set forth.

8. Stop-motion mechanism comprising a roller over which the sliver passes, a presser-lever compressing the sliver against the said roller, and having its pivot on the same side of the line of passage of the sliver as the roller and on the delivery side of the point of nearest approach between the presser-lever and roller, and motion-arresting devices co-acting with the said presser-lever as the latter oscillates, substantially as set forth.

9. Stop-motion mechanism comprising a backing or rest for the sliver, a presser-lever bearing upon the sliver passing over the said backing or rest and having its position determined by the thickness of the sliver, a bunter-frame moved by the presser-lever when the latter moves in one direction, and striker-mechanism engaging with the presser-lever and bunter-frame respectively, substantially as described.

10. The combination with a backing or rest for the sliver, of a presser-lever movable relatively to the said backing or rest in the direction of the line of passage of the sliver and having a press-plate to compress the sliver against the said backing or rest, and means to adjust the said press-plate toward and from the backing or rest, substantially as described.

11. The combination with a backing or rest for the sliver adjacent to the line of passage of the latter, of a presser-lever movable relatively to the said backing or rest in the direction of the line of passage of the sliver and having formed integrally with one part thereof a press-plate to compress the sliver against the said backing or rest, and a set-screw passing through a lug or projecting part of the presser-lever and engaging with said press-plate to adjust the same toward and from the backing or rest, substantially as described.

12. The presser-lever provided with a press-plate or surface for contact with the sliver, a lateral recess to admit the sliver under said press-plate, an opposite surface to constitute a lateral guide for the next adjacent sliver, and oppositely sloping inclines at its extremity to direct the slivers downwardly at the two sides of the presser-lever, substantially as described.

13. The combination with a series of presser-levers, each provided with a press-plate or surface for contact with a sliver, with a lateral recess to admit such sliver under said press-plate, with an opposite surface to constitute a lateral guide for the sliver in the recess of the next adjacent presser-lever, and with oppositely sloping inclines at its upper end to direct the slivers downwardly between adjacent presser-levers, of the finger at one end of the series formed with a guide-surface to retain the sliver in the recess of the next adjacent presser-lever, substantially as described.

14. The combination with a series of presser-levers, each provided with a press-plate or surface for contact with a sliver, with a lateral recess to admit such sliver under said presser-plate, with an opposite surface to constitute a lateral guide for the sliver in the recess of the next adjacent presser-lever, and with oppositely sloping inclines at its upper end to direct the slivers downwardly between adjacent presser-levers, of the finger at one end of the series formed with a guide surface to retain the sliver in the recess of the next adjacent presser-lever, and means for adjusting said finger laterally to compensate for changes in the number of presser-levers in use, substantially as described.

15. The combination with a backing or rest, and a series of presser-levers bearing upon the slivers passing over said backing or rest, of a stand on which said presser-levers are mounted, and means for adjusting said stand toward and from the said backing or rest, substantially as described.

In testimony whereof I affix my signature in the presence of two witnesses.

WILLIAM P. CANNING.

Witnesses:
SAML. G. STEPHENS,
MARY CAVERLY.